Patented Dec. 16, 1930

1,785,135

UNITED STATES PATENT OFFICE

HOWARD S. McQUAID, OF EAST CHICAGO, INDIANA, ASSIGNOR TO THE GRASSELLI CHEMICAL COMPANY, OF CLEVELAND, OHIO, A CORPORATION OF DELAWARE

FLUX FOR SOFT SOLDERING

No Drawing.   Application filed December 28, 1929. Serial No. 416,753.

Zinc chloride is perhaps the most common material used in the preparation of fluxes for soft soldering. It has the great disadvantage of being corrosive and if the soldered metal pieces are not thoroughly cleaned after the work is done traces of zinc chloride left on the solder will gradually corrode the metal.

Rosin, or colophony is the base of other types of fluxes which are extensively used. They are commonly applied either in the form of pastes or alcoholic solutions. They are not corrosive to the same extent as zinc chloride, but are not quite as efficient.

The present invention has for one of its purposes the use in soldering of a practically non-corrosive and efficient flux.

I have found that organic amine soaps have the properties required of an efficient soldering flux and my invention relates to soldering processes where a flux comprising an amine soap is used.

Free fatty acids and, of course, rosin acids, have as a general class, to a certain extent the properties of wetting metals and dissolving the oxide films present on metal pieces to be soldered, whereby they allow the solder to wet and spread and thereby unite with the metal pieces; they are, however, difficultly soluble in water and can therefore only be used in solutions of organic solvents, whereby their cost as fluxes becomes prohibitive. Organic amines, on the other hand, have only in individual and exceptional cases been found to possess fluxing properties. By chemically combining the two substances new chemical compounds are produced in which the fluxing properties of the base materials is greatly enhanced and which in addition are fairly soluble in water. Butylamine and the fatty acid of cocoanut oil have for instance, individually, very little, if any fluxing properties; when the two are combined to form the cocoanut oil butylamine soap a substance results which in efficiency as a soft soldering flux compares favorably in many instances with zinc chloride fluxes.

Chemically, soaps are generally understood to be salts, or combinations of a fatty acid, including the rosin acids, with a basic compound and the term "organic amine soaps" as used herein is meant to define soaps under the general classification in which the basic compound is an organic amine. The organic amine soaps are easily and conveniently prepared by melting together a free fatty acid and an amine. Physically the soaps are easily distinguished from either the free amine or fatty acids; they have usually a fair solubility in water and for this reason are particularly adapted to be used as fluxes in soldering work as this property obviates the necessity, as in the case of rosin fluxes, for using alcoholic solutions.

The following is a partial list of organic amine soaps used as soldering fluxes according to my invention and which were found to be satisfactory and efficient:

Toluidine stearate; aniline-stearate; di-phenylamine-stearate; beta-naphthylamine-stearate; butylamine-stearate; p-aminophenol-stearate; p-toluidine-stearate; tri-ethanolamine-stearate; beta-naphthylamine oleate; o-toluidine-oleate; aniline-oleate; butylamine-oleate; tri-ethanolamine-oleate; soaps from aniline, o-toluidine, beta-naphthylamine, tri-ethanolamine, diphenylamine and the cocoanut oil fatty acid; di-ethylamine-resinate, tri-ethanolamine-resinate.

While particularly efficient on tin plate with the usual 50 tin-50 lead solder, my novel fluxes have also outstanding fluxing properties on other metals such as brass, copper, galvanized iron, which are commonly united by soft soldering, and they can be used to advantage over zinc chloride, rosin or ammonium rosinate fluxes on such various metals.

It is, of course, very difficult to compare numerically the efficiency of fluxes, but any one skilled in the art easily recognizes if a flux works well or is inoperative in soldering. An attempt has been made to demonstrate flux efficiency by making comparative tests under standard conditions, wherein a predetermined amount of solder is applied to a piece of metal without or with a flux and measuring the thickness of the solder after cooling. The thicker the solidified drop of solder is found, the less it has spread and the less has been the efficiency of the flux. Applying such a test to organic amine soap fluxes, I found, for instance, that on tin plate the height of the solder was from 1/5 to 1/10 that of the solder applied without flux and in no instance was a reduction of less than 2/3 found.

The organic amine soaps can be used as fluxes in exactly the same manner as previously known fluxes. They can be applied as such or in aqueous solution or suspension, or if desired in alcoholic solutions. A 12% aqueous ethanolamine-oleate soap solution was for instance used as a flux in tin plate soldering and was found entirely satisfactory. The concentration of the flux or amount used depends upon the desired spread of the solder and can be varied as is well known by those skilled in the soldering art.

I claim:

1. In a process of soft soldering metals the step of applying a soldering flux comprising an organic amine soap.

2. In a process of soft soldering metals the step of applying a soldering flux comprising an aqueous solution of an organic amine soap.

3. In a process of soft soldering metals the step of applying a soldering flux comprising an aqueous solution of an organic amine-fatty acid soap.

4. As a soldering flux an organic amine soap.

5. As a soldering flux an organic amine-fatty acid soap.

6. As a soldering flux an aqueous solution of an organic amine soap.

In testimony whereof, I affix my signature.

HOWARD S. McQUAID.